No. 736,932. PATENTED AUG. 25, 1903.
W. T. M. BRUNNEMER.
SULKY PLOW.
APPLICATION FILED DEC. 6, 1901.
NO MODEL. 5 SHEETS—SHEET 1.
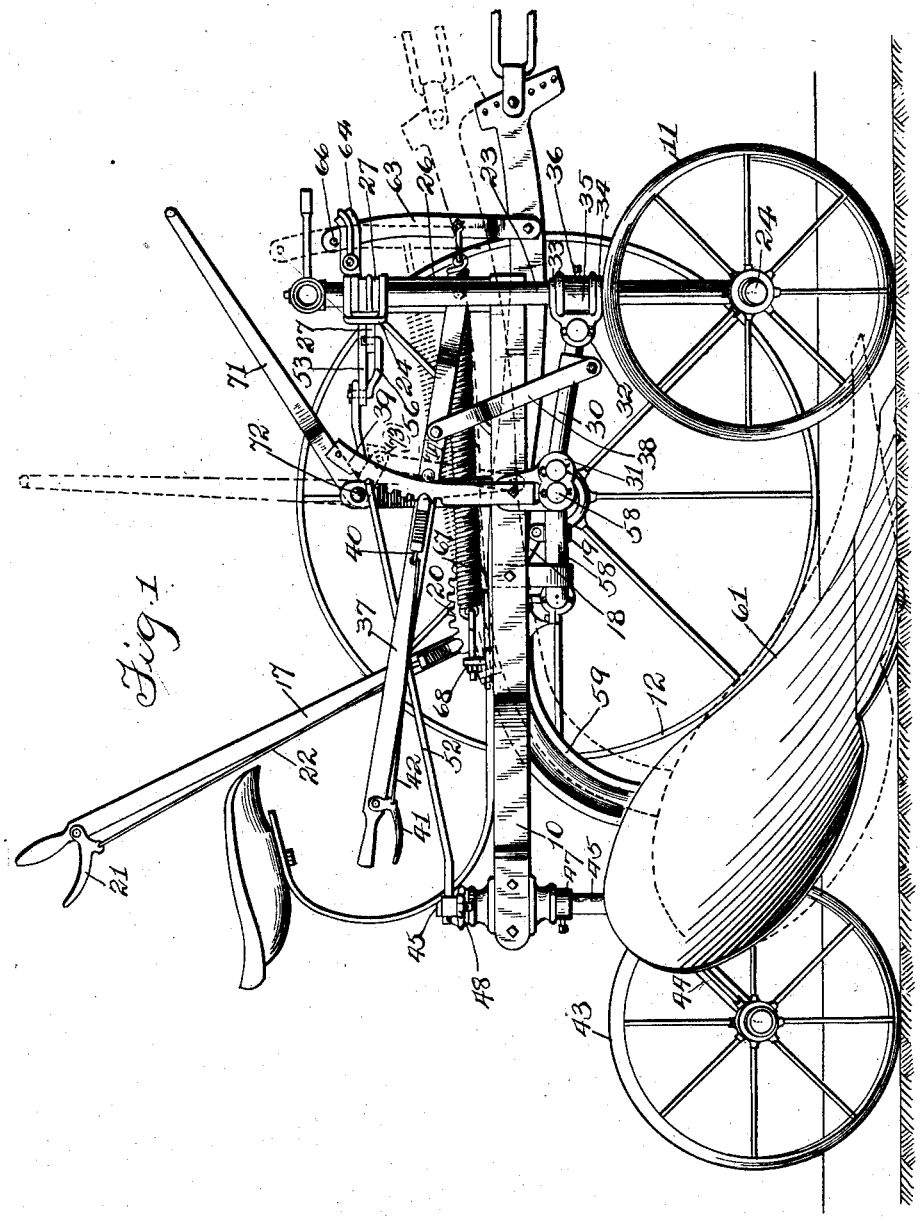

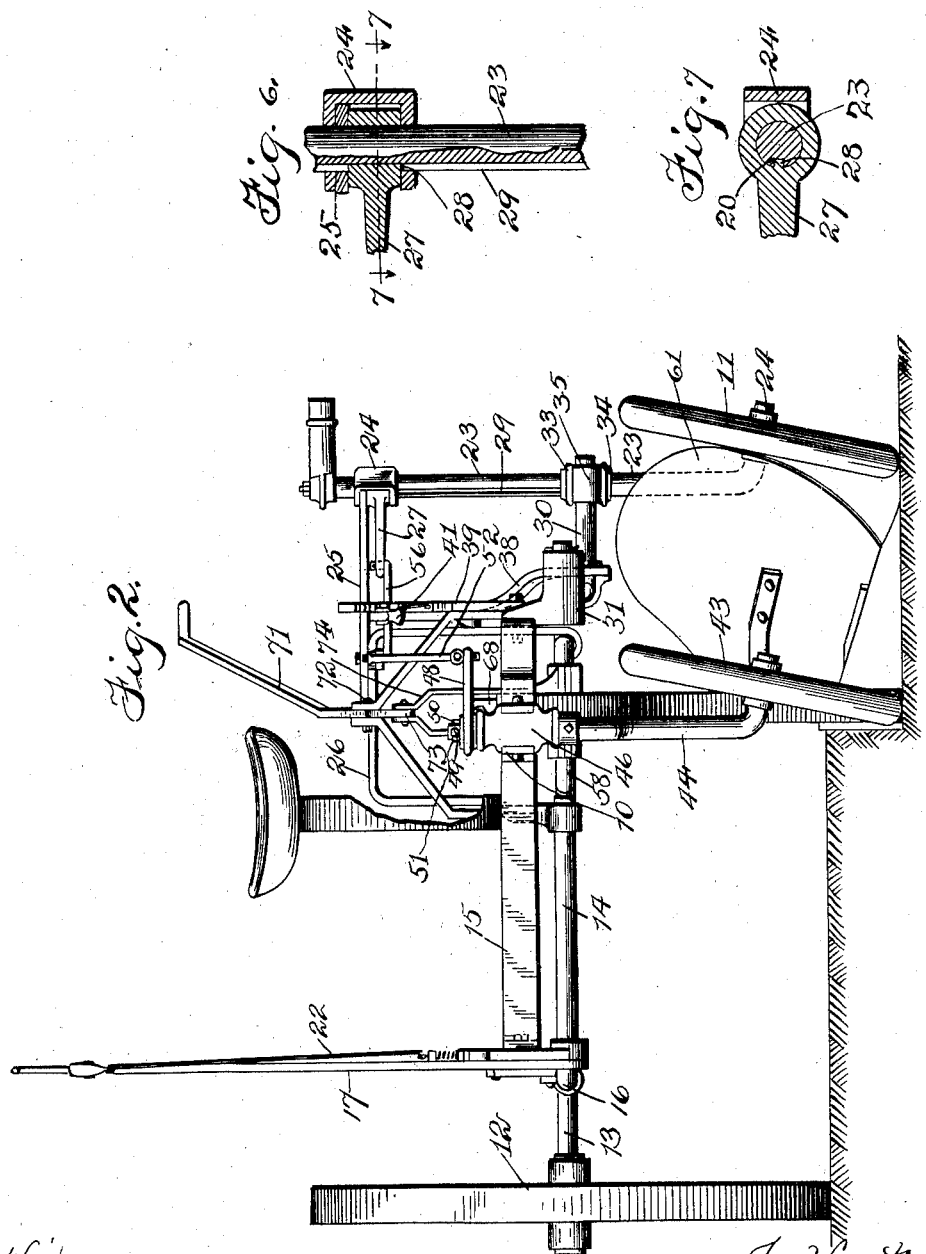

No. 736,932. PATENTED AUG. 25, 1903.
W. T. M. BRUNNEMER.
SULKY PLOW.
APPLICATION FILED DEC. 6, 1901.
NO MODEL. 5 SHEETS—SHEET 3.

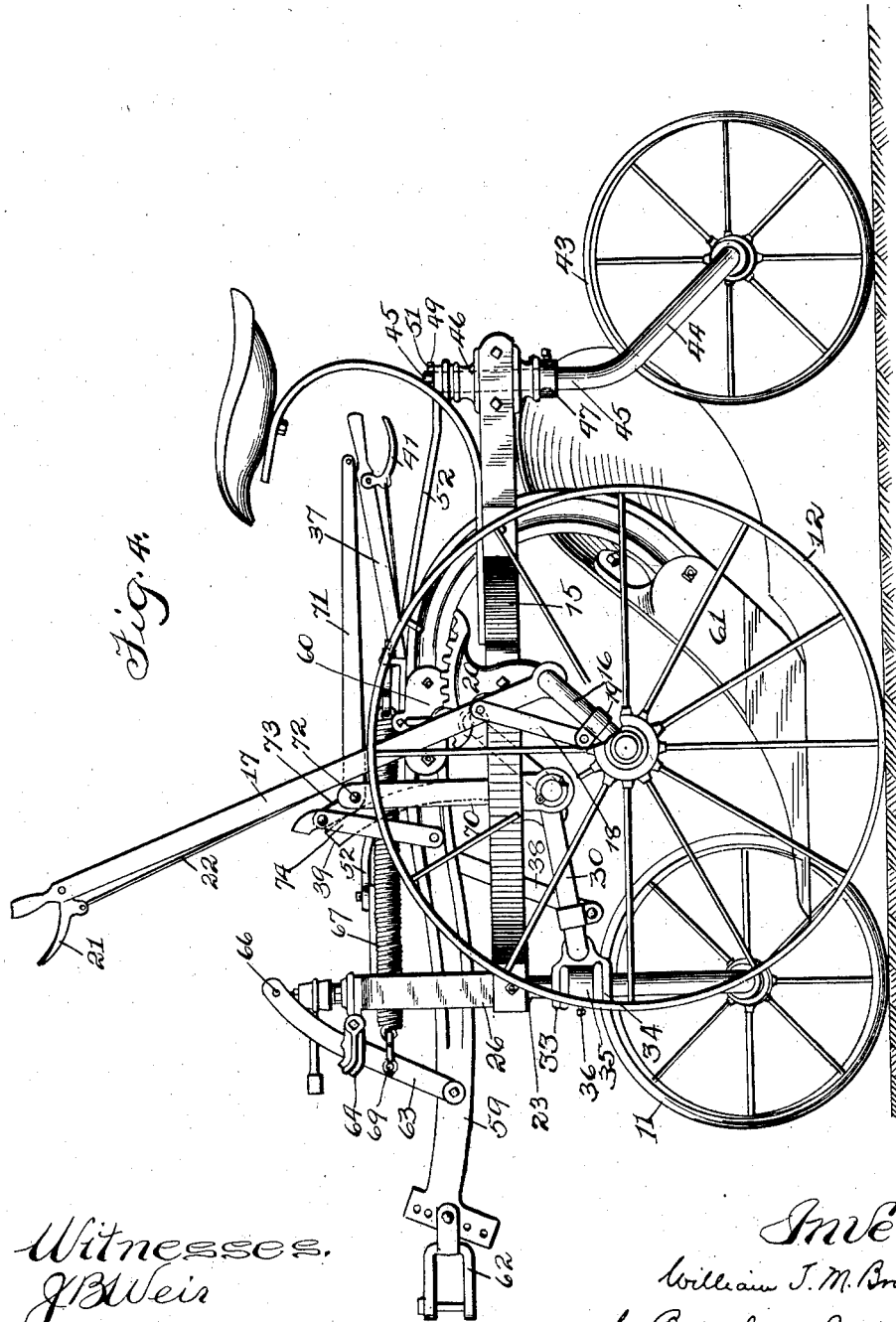

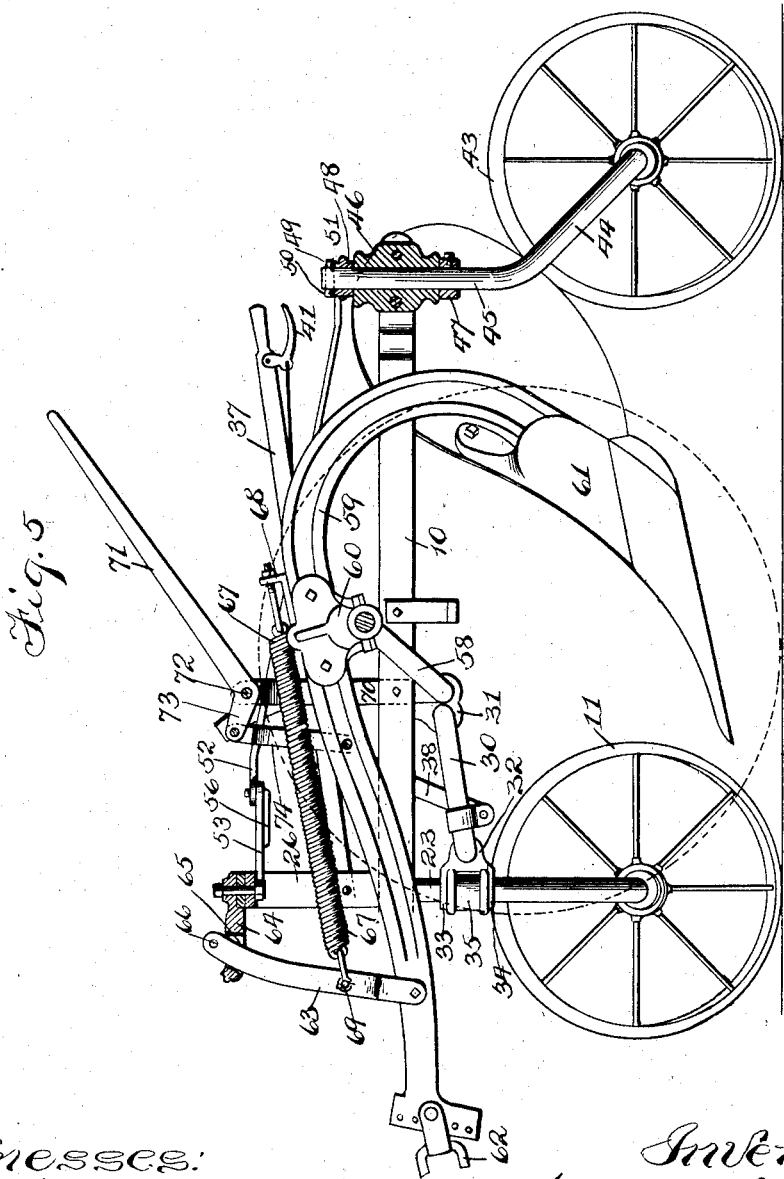

No. 736,932. Patented August 25, 1903.

UNITED STATES PATENT OFFICE.

WILLIAM T. M. BRUNNEMER, OF MONMOUTH, ILLINOIS, ASSIGNOR TO MONMOUTH PLOW COMPANY, OF MONMOUTH, ILLINOIS, A CORPORATION OF ILLINOIS.

SULKY-PLOW.

SPECIFICATION forming part of Letters Patent No. 736,932, dated August 25, 1903.

Application filed December 6, 1901. Serial No. 84,948. (No model.)

*To all whom it may concern:*

Be it known that I, WILLIAM T. M. BRUNNEMER, a citizen of the United States, residing at Monmouth, in the county of Warren and State of Illinois, have invented certain new and useful Improvements in Sulky-Plows, of which the following is a specification, reference being had to the accompanying drawings.

My invention relates to plows, and has for its object to provide certain improvements in sulky-plows. Such improvements have special reference to the mechanism for raising and lowering the plow, to the mechanism for controlling the position of the caster-wheel at the rear of the plow, to the mechanism for adjusting the height of the frame with reference to the furrow-wheel, and generally to the mounting of the plow in the frame, so that when in operation the strain is largely taken from the frame of the machine and sustained by the land and furrow wheels, making it possible to employ a frame much lighter in construction than has heretofore been practicable.

With regard to the mechanism for raising and lowering the plow my invention provides for automatically tilting the plow in lowering it, so that it enters the ground point first. It also provides for automatically reversing the position of the plow in raising it out of the ground, so that it rises point first, the one operation facilitating the insertion of the plow into the ground and the other its running out of the ground. This result is secured by pivotally mounting the plow-beam on a suitable support adapted to move vertically to raise and lower the plow and connecting the operating-lever to the beam in advance of the pivot thereof, so that when the lever is operated to lower the plow the front end of the beam will be tipped downward, while reverse movement of the lever reverses the front end of the beam. In order to effect such movement of the front end of the beam before the beam moves bodily downward or upward, a controlling device is provided which, in the construction illustrated is near the forward end of the beam, said controlling device being arranged to permit downward movement of the front end of the beam to a limited extent when the plow is elevated and to permit upward movement of the front end of the beam to a limited extent when the plow is in the ground. The arrangement is such that, for example, when the plow is to be lowered the operating-lever is thrown forward, carrying the front end of the beam down to the limit of its movement, as determined by the controller. During such movement the beam simply rocks on its support without moving bodily downward. Further forward movement of the lever then causes the pivotal support of the beam to move downward, since the forward end of the beam is held against further downward movement by the controller. The result is that the furrow-opener is first tilted to carry the point of the plow down, and the plow is then moved to its operative position. In raising the plow the operation is the reverse of that described, the controller permitting the front end of the beam to rise to the limit of its movement, after which further operation of the lever raises the pivotal support of the beam, carrying up the rear end thereof and with it the plow.

With regard to the devices for controlling the position of the caster-wheel, I provide improved means for holding such caster-wheel normally in the line of the furrow while the plow is moving in a straight line and for releasing the caster-wheel, so that it is free to turn in either direction when the plow is turned to the right or left. My improvements consist in providing the caster-wheel with the usual crank-arm and strut-brace, the forward end of said strut-brace being pivotally connected to a link adapted to swing in a horizontal plane and connected to the frame in such position that it is adapted to be in alinement with the strut-brace when the caster-wheel is in the line of the furrow. The strut-brace and link are moved out of alinement whenever the plow is turned by a connecting device connected to the furrow-wheel and either to the strut-brace or to the connecting-link, so that when the furrow-wheel turns on its axis the strut-brace and link are moved either to the right or left, and consequently, being moved out of alinement, they no longer lock, and the caster-wheel is released.

The third feature of my invention—to wit, the mechanism for adjusting the height of the frame with reference to the furrow-wheel—consists in connecting the frame adjustably to the vertical axle of the furrow-wheel by a swinging crank or bail adapted to turn about a horizontal axis.

The strain of the plow in operation is transmitted to the land and furrow wheels through the said pivoted bail and an arch or bail on which the beam is pivotally supported, said arch and bail lying approximately in the same horizontal plane when the plow is in operative position, so that the frame proper of the plow receives very little strain, and consequently may be made much lighter than in prior construction without loss of rigidity. This is an important feature of my invention, since it makes it practicable to construct a plow much lighter in weight and at a greatly-reduced cost.

In the drawings I have shown my improvements as embodied in a plow; but I wish it to be understood that while the drawings show the best embodiment of my invention so far as I am at present advised my invention is not restricted to the specific construction illustrated except in so far as such details of construction are particularly claimed.

I shall now describe more particularly the construction and operation of the plow illustrated in the drawings.

Referring to the drawings, Figure 1 is a side elevation showing in full lines the position of the plow when in operation and in dotted lines the position of the plow when ready to run out of the ground. Fig. 2 is a rear view showing the plow in the position illustrated in full lines in Fig. 1. Fig. 3 is a plan view. Fig. 4 is a side elevation, some parts being broken away, showing the plow in carrying position. Fig. 5 is a side elevation showing the plow in position to be lowered and run into the ground. Fig. 6 is a partial vertical section illustrating the upper portion of the furrow-wheel axle and the devices for connecting the strut-brace-operating arm therewith. Fig. 7 is a horizontal section on line 7 7 of Fig. 6; and Fig. 8 is a detail, partly in section, of the caster-wheel spindle and arm.

In the drawings, 10 indicates the frame of the machine, which is of suitable shape to support the parts thereof. The plow illustrated in the drawings being arranged to throw the dirt to the right, the furrow-wheel 11 is on the right and the land-wheel 12 on the left, as shown in Fig. 3. The land-wheel is mounted upon the outer portion 13 of a cranked axle, the inner portion 14 thereof being pivotally supported by the frame of the machine. A lateral brace 15 is provided, which is secured to the frame and extends out to near the intermediate portion 16 of said axle, forming an extended support for the axle, as shown in Fig. 3.

17 indicates an operating-lever for rocking the land-wheel axle to adjust the height of the frame with reference to the land-wheel. Said lever 17 is mounted upon the inner portion 14 of said axle and is connected to the intermediate portion 16 of said axle, near the outer portion thereof, by a link 18 and collar 19. (Best shown in Fig. 4.) The collar 19 is tightly clamped on the intermediate portion 16, so that the lever 17 does not rock upon the axle, but when operated rotates the axle, turning it so that the portions 13 and 14 of said axle approach or recede from a common horizontal plane, consequently carrying the hub of the land-wheel toward or from the plane of the frame of the machine, with the result that the frame is lowered or raised with reference to the ground. A segmental rack 20 is provided, adapted to receive a dog carried by the lever 17 and operated by a hand-lever 21 and connecting-rod 22 for locking the lever 17 in different positions with relation to the frame of the machine, and consequently locking the axle in position. The arrangement of the land-wheel axle is such that under ordinary operating conditions the intermediate portion 16 of said axle lies in a horizontal position, as indicated in Figs. 1 and 2.

The furrow-wheel 11 is mounted at the lower end of a vertical axle 23, said axle having an outwardly and downwardly inclined spindle 24 at its lower end. The axle 23 is pivoted at its upper end in a frame 24', carried by a bracket 25, which projects from an arch 26, carried at the front end of the frame of the machine, as shown in Fig. 2. The frame 24 is U-shaped, as shown in Fig. 6, to accommodate the inner end of an arm 27, which is fitted upon the axle 23 and is keyed thereto by a feather 28, as shown in Fig. 6, said feather working in a longitudinal slot 29 in the axle 23. By this construction the axle 23 may be moved vertically in the bracket 24 without carrying with it the arm 27, which remains keyed to said axle. The lower portion of the axle 23 is connected to the frame of the machine by a bail or crank 30. (Best shown in Figs. 1 and 3.) The rear portion of said bail is journaled in a bearing 31, formed in and secured to the frame of the machine. The forward portion of said bail is pivoted in a bearing 32, having forked arms 33 34, which are fitted upon the axle 23, as best shown in Figs. 1 and 2. Between said arms 33 34 is a sleeve 35, which is secured to the axle 23 by a set-screw 36, (best shown in Figs. 1 and 4,) by which construction the axle 23 is free to rotate in the arms 33 34, but said axle may be moved vertically by raising and lowering said arms, which is accomplished by swinging the forward end of the bail 30 upward or downward. Obviously when the axle 23 is raised or lowered the position of the furrow-wheel with relation to the frame of the machine is varied accordingly. The swinging of the bail 30 is accomplished by means of a lever 37, pivoted at its front end to a suitable support in the frame of the machine, preferably one of the sides of the arch 26, and connected by a link 38 with the forward portion of the bail 30.

(Best shown in Fig. 1.) A segmental rack 39 is provided which rises from the frame of the machine and is engaged by a dog 40, carried by the lever 37 and operated by a hand-lever 41 and connecting-rod 42, so that by operating said lever the bail 30 may be rocked and secured in its different positions of adjustment.

The caster-wheel 43 is mounted on the lower inclined portion 45 of a spindle 45 in the usual way, said spindle being fitted in a suitable bearing 46 at the rear end of the frame of the machine. A collar 47, secured to the spindle 45 under the bearing 46, supports the rear end of the frame, as shown in Fig. 5.

48 indicates an arm loosely mounted on the spindle 45 above the bearing 46. The arm 48 is retained upon the spindle 45 by a pin 49, as shown in Fig. 8, and is provided with lugs 50 51, which lie at opposite sides of the pin 49 and when the caster-wheel is in operative position engage said pin, as shown in Fig. 8. It will be seen, therefore, that the arm 48 is free to rotate through an arc of about one hundred and seventy degrees independently of the spindle 45, and by means of the lugs 50 51 the tendency of the caster-wheel 43 to turn in toward the land is transmitted to the arm 48. In order to resist this tendency, the arm 48 is held normally in the position shown in Fig. 3 substantially perpendicular to the line of the furrow by a thrust-bar 52, connected at its rear end to the arm 48 and at its forward end to a pivoted link 53, the forward end of said link being in turn connected to the frame of the machine, as shown in Fig. 3. 54 indicates the pivot connecting said thrust-bar 52 and link 53.

55 indicates the pivot by which the link 53 is connected to the frame.

As shown in Fig. 3, when the arm 48 is in its normal position the thrust-bar 52 and link 53 are in alinement, so that the end thrust being in line with the pivots of said thrust-bar and link is neutralized, the arm 48 being locked in position. When, however, said thrust-bar and link are moved out of alinement, the arm 48 is moved forward, releasing the spindle 45 of the caster-wheel and permitting the caster-wheel to turn in either direction. In order to move the thrust-bar 52 and link 53 out of alinement when the machine is turned, the arm 27 of the furrow-wheel axle 23 is connected by a link 56 with said pivot 54 or, if desired, with the thrust-bar or link, as best shown in Fig. 3. Said connecting-rod 52 and link 53 are arranged to be in alinement when the pivot 57, which connects the arm 27 with the connecting-rod 56, is in line with the pivot 54 and the upper end of the furrow-wheel axle 23, as shown. When, however, the furrow-wheel axle is turned, as is the case when the machine is turned, the arm 27 being keyed on the furrow-wheel axle is swung to one side or the other, moving the thrust-bar 52 and link 53 out of alinement and releasing the arm 48, so that the caster-wheel may be turned independently thereof. This operation takes place in whichever direction the machine is placed.

58 indicates a bail the ends of which are pivotally supported in the frame of the machine, as best shown in Figs. 3 and 5.

59 indicates the plow-beam, which is pivotally mounted centrally upon the bail, preferably by means of a bracket 60, as shown in Fig. 5.

61 indicates the furrow-opener, which, as shown, consists of an ordinary moldboard-plow, and 62 the draft connections at the front end of the beam.

63 indicates a controlling device consisting of a bar the lower end of which is pivoted to the front end of the beam, its upper end being fitted in a bracket 64, secured upon the arch 26 of the frame and projecting forward, as shown in Fig. 5. The upper end of the bar 63 passes through a suitable slot 65 in the bracket 64 and is provided with a pin 66 above said bracket, which prevents downward movement of the bar 63 beyond a predetermined point.

67 indicates a spring the rear end of which is connected, preferably, by a bracket 68 to the plow-beam at a point adjacent to the bracket 60 and at its forward end is connected by a pin 69 to the bar 63 near its lower end. The pin 69 serves also as a limited stop to prevent the bar 63 moving up beyond a predetermined point, since by its engagement with the under side of the bracket 64 it prevents such excessive upward movement.

70 indicates an arch or bail, also secured to the frame of the machine and extending, preferably, in a vertical plane, as shown in Fig. 5. Said arch 70 serves as a support for a lifting-lever 71, which is mounted on a pivot 72, secured in the upper portion of the arch 70, as shown in Fig. 5. The lever 71 is of the bell-crank variety, having an arm 73, which projects forward of the arch 70, as shown in Fig. 5. Said arm 73 is connected by a link 74 with the plow-beam 59 at a point in advance of the bracket 60.

When the plow is in its elevated position, such as that shown in Figs. 4 and 5, the bail 58, on which it is mounted, is in an inclined position, being inclined upward from front to rear, as shown in Fig. 5. When, however, the plow is in the ground, as shown in Fig. 1, the bail 58 assumes a substantially horizontal position, as shown, the bail 58 then lying substantially in the plane of the bail 30 and the intermediate portion 16 of the land-wheel axle, so that the strain in operating is transmitted directly to the wheels without passing through the frame to any considerable extent, consequently making it practicable to employ a frame of lighter construction without loss of rigidity.

The operation of the raising and lowering devices is as follows: Assuming the plow to be in its carrying position, (shown in Fig. 4,)

the parts will then be as illustrated in said figure, the lifting-lever 71 being in substantially a horizontal position, as shown. To lower the plow, the lever 71 is thrown upward and forward, by which operation downward pressure is applied to the plow-beam in advance of its pivot through the arm 73 of said lever and the link 74. The effect of this is to depress the forward end of the beam, carrying it down to the position shown in Fig. 5, the controller 63 serving to limit further downward movement when the beam has been moved to the position illustrated. When the lever 71 advances beyond the position shown in Fig. 5, the forward portion of the beam being incapable of further downward movement, the downward pressure is transmitted to the bail 58, which then swings downward and backward, carrying the plow down to the position shown in full lines in Fig. 1, at the same time stretching the spring 67. The plow is then in operative position, it being understood that while the operation just described is taking place the operator has also thrown the lever 17 back to raise the land-wheel with reference to the frame to the position shown in Fig. 1. It will be noted that the spring 67 will then act substantially in line with the draft, and consequently, owing to the mounting of the beam, then has substantially no lifting effect. To raise the plow, the operation is the reverse of that just described. The lever 71 being thrown backward, the forward portion of the beam is drawn upward by means of the link 74, tilting the plow, so that its point is directed upward, as indicated by dotted lines in Fig. 1. This carries the controller 63 up until its point 69 strikes the bracket 64, when further backward movement of the lever 71 operates to swing the bail 58, carrying the rear portion of the beam upward. The spring 67 assists in this operation, and its action is promoted by reason of the fact that the carrying up of the forward end of the spring by reason of the forward movement of the controller 63 transfers the application of the power of the spring to a more favorable position with reference to the bail, consequently increasing its efficiency. It will thus be seen that however the plow is adjusted, either to move it into the ground or out of it, the point is properly directed so as to facilitate the operation.

That which I claim as my invention, and desire to secure by Letters Patent, is—

1. In a sulky-plow, the combination of a machine-frame, a furrow-wheel, a land-wheel, axles for said land and furrow wheels, a furrow-opener, draft devices connected therewith, and means supported in the frame and adapted to transmit the draft strain of the furrow-opener to said land and furrow wheel axles without applying it to the frame, substantially as described.

2. In a sulky-plow, the combination with a machine-frame, a land-wheel, a crank-axle therefor, a furrow-wheel, an axle therefor, a bail connecting said furrow-wheel axle with the machine-frame, a furrow-opener, a bail carrying said furrow-opener and pivotally supported by the frame of the machine, said bails and crank-axle being adapted to lie in substantially horizontal planes when the furrow-opener is in operative position, substantially as described.

3. In a sulky-plow, the combination with a machine-frame, a land-wheel, a crank-axle therefor, a furrow-wheel, an axle therefor, a bail connecting said furrow-wheel axle with the machine-frame, a furrow-opener, and a bail carrying said furrow-opener and pivotally supported by the frame of the machine, said bails and crank-axle being adapted to lie substantially in the same horizontal plane when the furrow-opener is in operative position, substantially as described.

4. In a sulky-plow, the combination of a machine-frame, a furrow-wheel, a vertical axle therefor, a bail pivotally mounted in the machine-frame and pivotally connected to said furrow-wheel axle, means preventing longitudinal movement of said axle independently of said bail, and means for vertically adjusting said bail to adjust the position of said furrow-wheel with reference to the frame of the machine, substantially as described.

5. In a sulky-plow, the combination of a machine-frame, a furrow-wheel, a vertical axle therefor, a bail pivotally mounted in the machine-frame and pivotally connected to said furrow-wheel axle, means preventing longitudinal movement of said axle independently of said bail, a lever for adjusting said bail, and means for locking said lever in different positions for adjustment, substantially as described.

6. In a sulky-plow, the combination of a machine-frame, a furrow-wheel, a vertically-disposed axle for said furrow-wheel, a bail pivoted at its rear end in the frame of the machine, a bracket pivotally connected to the forward portion of said bail, arms carried by said bracket and embracing said furrow-wheel axle, a collar fixedly secured to said axle between said arms, and means for vertically adjusting the forward portion of said bail, substantially as described.

7. In an agricultural implement, the combination of a machine-frame, a caster-wheel carried at the rear end thereof and adapted to swing about a substantially vertical axis, an arm connected to the pivot of said caster-wheel, a thrust-bar connected to said arm, a link pivoted to the forward end of said thrust-bar and to the frame of the machine, said thrust-bar and link being adapted to lie in alinement when the caster-wheel is in its normal position, a wheel mounted in the forward portion of the frame and adapted to swing about a substantially vertical axis, and means operated by the swinging of said latter wheel upon its axis for moving said thrust-bar and link out of alinement, substantially as described.

8. In an agricultural implement, the combination of a machine-frame, a caster-wheel carried at the rear end thereof and adapted to swing about a substantially vertical axis, an arm connected to the pivot of said caster-wheel, a thrust-bar connected to said arm, a link pivoted to the forward end of said thrust-bar and to the frame of the machine, said thrust-bar and link being adapted to lie in alinement when the caster-wheel is in its normal position, a furrow-wheel carried by said frame and adapted to swing about a substantially vertical axis, an arm carried by the axle of said furrow-wheel, a link connected to said last-mentioned arm and acting to move said thrust-bar and said first-mentioned link out of alinement when the furrow-wheel swings out of its normal position, substantially as described.

9. In an agricultural implement, the combination of a machine-frame, a caster-wheel carried at the rear end thereof and adapted to swing about a substantially vertical axis, an arm connected to the pivot of said caster-wheel, a thrust-bar connected to said arm, a link pivoted to the forward end of said thrust-bar and to the frame of the machine, said thrust-bar and link being adapted to lie in alinement when the caster-wheel is in its normal position, a furrow-wheel carried by said frame and adapted to swing about a substantially vertical axis, an arm carried by the axle of said furrow-wheel, a link connected to the pivot of said thrust-bar and said first-mentioned link for moving said thrust-bar and link out of alinement when said furrow-wheel swings out of its normal position, substantially as described.

10. In an agricultural implement, the combination of a machine-frame, a furrow-wheel pivoted to swing about a substantially vertical axis, a caster-wheel carried at the rear portion of said frame and adapted to swing about a substantially vertical axis, an arm carried by the pivot of said caster-wheel, a thrust-bar connected to said arm, means adapted to resist the thrust of said thrust-bar when said caster-wheel is in its normal position, means operated by the rotation of said furrow-wheel for releasing said thrust-bar when said furrow-wheel is moved out of its normal position, and means for vertically adjusting the furrow-wheel with reference to the frame, substantially as described.

11. In an agricultural implement, the combination of a machine-frame, a furrow-wheel, a vertical axle for said furrow-wheel, means for adjusting said axle vertically with reference to the machine-frame, an arm carried by said furrow-wheel axle and non-rotatably secured thereto, said axle being vertically movable independently of said arm, a caster-wheel pivoted to swing about a substantially vertical axis, an arm carried by said caster-wheel, a thrust-bar connected to said caster-wheel arm, and means operated by the swinging of said furrow-wheel arm for locking or releasing said thrust-bar, substantially as described.

12. In an agricultural implement, the combination of a machine-frame, a furrow-wheel, a vertical axle for said furrow-wheel, means for adjusting said axle vertically with reference to the machine-frame, an arm carried by said furrow-wheel axle and non-rotatably secured thereto, said axle being vertically movable independently of said arm, a caster-wheel pivoted to swing about a substantially vertical axis, an arm carried by said caster-wheel, a thrust-bar connected to said caster-wheel arm, a link pivoted to the forward end of said thrust-bar and to the machine-frame and adapted to lie in alinement with said thrust-bar, and means operated by the swinging of said furrow-wheel arm for moving said thrust-bar and link out of alinement when the furrow-wheel moves out of its normal position, substantially as described.

13. In an agricultural implement, the combination of a machine-frame, a furrow-wheel, a vertical axle for said furrow-wheel, means for adjusting said axle vertically with reference to the machine-frame, an arm carried by said furrow-wheel axle and non-rotatably secured thereto, said axle being vertically movable independently of said arm, a caster-wheel pivoted to swing about a substantially vertical axis, an arm carried by said caster-wheel, a thrust-bar connected to said caster-wheel arm, a link pivoted to the forward end of said thrust-bar and to the machine-frame and adapted to lie in alinement with said thrust-bar, and a link connecting said furrow-wheel arm with the forward portion of the thrust-bar for releasing said thrust-bar when the furrow-wheel moves out of its normal position, substantially as described.

14. In a plow, the combination of a machine-frame, a bail pivotally mounted therein, a plow-beam pivoted upon said bail, said bail being adapted to be rocked backward and downward to carry the plow into operative position, a bar pivoted at its lower end to the forward portion of the plow-beam and adjustably mounted in a suitable support at its upper end, a spring connected at its rear end to the plow-beam and at its forward end to the lower portion of said bar, and means for moving said bar upward to carry the forward portion of the spring upward, whereby the power of the spring will be applied at a more favorable angle in lifting the plow, substantially as described.

15. In a plow, the combination of a machine-frame, a bail pivoted therein, a plow-beam pivoted upon said bail, said bail being arranged to swing upward and forward to raise the plow out of operative position, a spring connected at its rear end with said beam, a support connected to the forward portion of the plow-beam, the forward end of said spring being connected to said support, and means for rocking the beam upon said bail to carry the forward end of said beam upward in advance of the rear end thereof in lifting the plow, whereby the power of the spring will be applied to the bail at a more favorable angle in lifting the plow, substantially as described.

16. In a plow, the combination of a machine-frame, a bail pivoted therein, a plow-beam pivoted upon said bail, said bail being adapted to swing upward and forward to raise the plow, a bar pivoted at its lower end to the forward portion of said beam, a guide for the upper portion of said bar, a spring connected at its forward end to the lower portion of said bar and at its rear end with said beam, and lever mechanism for swinging the beam upon said bail to move the forward end thereof upward in advance of the rear end thereof in raising the plow, and the forward end of said beam downward in advance of the rear end thereof in lowering the plow, substantially as described.

17. In a plow, the combination of a machine-frame, a bail pivoted therein, a plow-beam pivotally mounted upon said bail, means for swinging said beam upon said bail independently of movement of the bail, to direct the point of the plow downward in lowering the plow and to direct it upward in raising the plow, and controlling mechanism adapted to permit limited rocking movement of the beam independently of movement of the bail, substantially as described.

18. In a plow, the combination of a machine-frame, a plow-beam, a pivotal support upon which said beam is mounted, said pivotal support being adjustable to raise the plow out of the ground or to lower it into the ground, means for tilting the plow-beam upon its support independently of movement thereof, to direct the point of the plow upward or downward, and controlling mechanism adapted to permit limited rocking movement of the beam upon its support independently of vertical movement of the support, substantially as described.

19. In a plow the combination of a machine-frame, a bail pivoted therein, a plow-beam pivoted upon said bail, said bail being adapted to assume an inclined position when the plow is out of operative position, a controller near the forward end of the plow-beam for limiting the vertical movement thereof in either direction, and means for rocking said beam upon the bail to direct the point of the plow upward or downward, and a controller for limiting the movement of the plow-beam in either direction, substantially as described.

20. In a plow, the combination of a machine-frame, a bail pivoted therein, a plow-beam pivoted upon said bail, said bail being adapted to assume an inclined position when the plow is out of operative position, a controller near the forward end of the plow-beam for limiting the vertical movement thereof in either direction, and means acting on said beam between said bail and said controller for rocking said beam, substantially as and for the purpose specified.

21. In a plow, the combination of a machine-frame, a bail pivoted therein, a plow-beam pivoted upon said bail, said bail being adapted to assume an inclined position when the plow is out of operative position, a controller near the forward end of the plow-beam for limiting the vertical movement thereof in either direction, and lever mechanism operating on said beam for rocking said beam and said bail, substantially as described.

22. In a plow, the combination of a machine-frame, a bail pivotally supported thereby, a plow-beam pivoted upon said bail, a controller connected to the forward portion of said beam for limiting the vertical movement thereof in either direction, an arch supported upon the frame of the machine, a lever carried by said arch, an arm carried by said lever, and means connecting said arm with said beam at a point forward of said bail, substantially as described.

23. In a plow, the combination of a machine-frame, a bail pivotally supported thereby, a plow-beam pivoted upon said bail, a controller connected to the forward portion of said beam for limiting the vertical movement thereof in either direction, an arch supported upon the frame of the machine, a lever carried by said arch, an arm carried by said lever, means connecting said arm with said beam at a point forward of said bail, and a spring connected to said beam and to said controller, substantially as described.

24. In a plow, the combination of a machine-frame, a bail pivoted therein, a plow-beam pivotally mounted upon said bail, and means for rocking the beam upon the bail before the bail is swung, said means acting also to swing said bail to raise and lower the plow, substantially as described.

25. In a plow, the combination of a machine-frame, a bail pivotally supported thereby, a beam pivotally mounted upon said bail, a controller connected with the front portion of said beam and with the frame for limiting the vertical movement of the beam, said controller being loosely connected at one of its ends, and means for swinging said beam upon said bail, substantially as described.

26. In a plow, the combination of a machine-frame, wheels therefor, a furrow-opener carried by said machine-frame, and means for relieving the machine-frame from the draft upon the furrow-opener when the latter is in operative position, substantially as described.

27. In a plow, the combination of a machine-frame, a bail pivotally supported thereby, a plow-beam pivoted upon said bail, a controller pivotally connected at one end with the forward portion of the plow-beam and movably connected at the other end with a suitable support for limiting the vertical movement of the beam, an operating-lever supported on the frame of the machine, an arm carried by said lever, and means connecting said arm with said beam forward of the bail and in the rear of said controller, substantially as described.

28. In a plow, the combination of a machine-frame, a bail pivoted therein, a plow-beam pivotally mounted upon said bail, a controller for limiting the vertical movement of the front portion of said beam, and a spring connected with said controller and with said beam, substantially as described.

29. In a plow, the combination of a machine-frame, a bail pivoted therein, a plow-beam pivotally mounted upon said bail, a controller for limiting the vertical movement of the front portion of said beam, a spring connected with said controller and with said beam, and means for rocking said beam upon said bail, substantially as described.

30. In an agricultural implement, the combination of a plow, a lifting-spring having normally substantially no lifting effect on the plow when the latter is in operative position, said spring being connected at its rear end with a plow-beam and at its forward end with a suitable support, and means for varying the position of the front end of said spring to cause it to exert lifting stress on the plow, substantially as described.

31. In an agricultural implement, the combination of a plow, a lifting-spring, connected at its rear end with the plow-beam and at its forward end with a suitable support, means for varying the position of the front end of said spring to increase its lifting stress on the plow, and means for rocking the plow to direct the point thereof upward for running it out of the ground, substantially as described.

32. In an agricultural implement, the combination of a machine-frame, a plow, a lifting-spring connected with the plow and adjustably connected with the machine-frame, lever mechanism for raising and lowering the plow, and means for automatically adjusting the connection between the spring and the machine-frame to vary the action of the spring upon the plow, substantially as described.

33. In an agricultural implement, the combination of a machine-frame, a plow, a lifting-spring connected with the plow and adjustably connected with the machine-frame, lever mechanism for raising and lowering the plow, and means for automatically adjusting the connection between the spring and the machine-frame to increase the lifting effect of the spring upon the plow when the lever mechanism is operated to raise the plow, substantially as described.

34. In an agricultural implement, the combination of a machine-frame, a caster-wheel, a bar which controls the swinging of the caster-wheel in one direction, means mounted on the machine-frame for locking said bar in operative position when the caster-wheel is in its normal position, and means operated by variation of the line of draft from the normal for unlocking said bar, substantially as described.

35. In an agricultural implement, the combination of a machine-frame, a rear caster-wheel, a front caster-wheel, a bar which controls the swinging of the rear caster-wheel in one direction, means mounted on the machine-frame for locking said bar in operative position when the front caster-wheel is in its normal position, and means operated by the swinging of said front caster-wheel in either direction for unlocking said bar, substantially as described.

36. In an agricultural implement, the combination of a machine-frame, a caster-wheel, a bar which controls the swinging of the caster-wheel in one direction, a pivoted link carried by the machine-frame adapted to move into alinement with said bar for locking the same in operative position, and means operated by variation of the line of draft from the normal for unlocking said bar, substantially as described.

37. In an agricultural implement, the combination of a machine-frame, a rear caster-wheel, a front caster-wheel, a bar which controls the swinging of the rear caster-wheel in one direction, a pivoted link carried by the machine-frame and movable into alinement with said bar for locking the same in operative position, and means operated by the swinging of said front caster-wheel out of its normal position for unlocking said bar, substantially as described.

38. In an agricultural implement, the combination of a machine-frame, a bail pivotally mounted therein, a plow-beam pivoted near its rear portion upon said bail, and a spring connected at its rear end with said plow-beam and at its forward end with a suitable support, substantially as described.

39. In an agricultural implement, the combination of a machine-frame, a bail pivotally mounted therein, a plow-beam pivoted near its rear portion upon said bail, a spring connected at its rear end with said plow-beam and at its forward end with a suitable support, and a lifting-lever connected with said bail, substantially as described.

40. In a plow, the combination of a machine-frame, a bail pivoted therein, a plow-beam pivotally mounted upon said bail, a controller connected with the front portion of the plow-beam for limiting the vertical movement thereof, and a spring connected with said controller and with said beam, substantially as described.

41. In a plow, the combination of a machine-frame, a bail pivoted therein, a plow-beam pivotally mounted upon said bail, a controller connected with the front portion of the plow-beam for limiting the vertical movement thereof, a spring connected with said controller and with said beam, and means for rocking said beam upon said bail, substantially as described.

42. In a plow, the combination of a machine-frame, a bail pivotally supported thereby, a plow-beam pivoted upon said bail, a controller pivotally connected at one end to the forward portion of the beam and loosely connected at the other end to the frame for limiting the vertical movement of the beam in either direction, an arch upon the frame of the machine, a lever carried by said arch, an arm carried by said lever, and means connecting said arm with said beam at a point forward of said bail, substantially as described.

43. In a plow, the combination of a machine-frame, a bail pivotally supported thereby, a plow-beam pivoted upon said bail, a controller pivotally connected at one end to the forward portion of said beam and movably connected at the other end with a suitable support for limiting the vertical movement of the beam in either direction, an arch carried by said frame, a lever carried by said arch, an arm carried by said lever, means connecting said arm with said beam at a point forward of said beam, and a spring connected to said beam and to said controller, substantially as described.

WILLIAM T. M. BRUNNEMER.

Witnesses:
H. B. WEBSTER,
N. E. JOHNSON.